United States Patent Office 2,858,214
Patented Oct. 28, 1958

2,858,214

LIGHT SENSITIVE PLATE COATING

Lawrence L. Pries, Santa Fe, N. Mex.

No Drawing. Application September 30, 1955
Serial No. 537,878

1 Claim. (Cl. 96—93)

The present invention relates to a new and improved coating composition, and more particularly to the provision of a new photolithographic plate coating for surface plates such as zinc or aluminum.

Heretofore it has been impossible to properly provide a coating solution for making photolithographic surface plates on zinc or aluminum metal, but the present invention on the other hand, seeks to provide a photolithographic light sensitive plate coating for surface plates which is highly effective at all times.

To the accomplishment of the foregoing and related ends, the invention then comprises the features hereinafter fully described, and particularly pointed out in the claim, the following description setting forth in detail certain illustrative embodiments of the invention, these being indicative however of but a few of the various ways in which the principle of the invention may be employed.

It has now been found, in accordance with the present invention, that a mixture of an albumen solution and an ammonium bichromate solution can be mixed together to provide a plate coating solution, so that the ingredients will not separate while standing or in use.

The albumen solution contains egg albumen, water, ammonium hydroxide, and the ammonium bichromate solution contains a dibasic ammonium phosphate, ammonium nitrate, ammonium bichromate and water as required.

As an example of the albumen solution which may be 6° Baumé, the following is given:

| | |
|---|---|
| Egg albumen (scales) | avoir. ounces 4 |
| Water | liquid ounces 20 |
| Ammonium hydroxide, 58% analytical reagent | do 1 |

In preparing the albumen solution, the egg albumen is placed in water to dissolve and after the albumen is dissolved the ammonia is added. The albumen solution should be 6° Baumé, but if it is too heavy additional water is added. Then, the solution is strained through a suitable filter such as a piece of cloth and then placed in bottles.

The following is given as an example of the ammonium bichromate solution which may be 10° Baumé:

| | |
|---|---|
| Water | liquid ounces 12 |
| Ammonium phosphate (dibasic) (granular) | avoir. ounce ½ |
| Ammonium nitrate (analytical reagent) | do ½ |
| Ammonium bichromate (photo) | do 1 |

In preparing the ammonium bichromate solution, each chemical is dissolved before adding the next ingredient, and after the ingredients are dissolved, the solution should be 10° Baumé. If the solution is too heavy additional water is added and then bottled.

The plate coating solution may be 3° Baumé, and may consist of two parts or 2 ounces of the albumen solution which is 6° Baumé, together with one part or 1 ounce of the bichromate solution which is 10° Baumé. Then, water is added to make the plate coating 3° Baumé which may take about 9 ounces of water. Then, the solution is filtered and placed in bottles and capped, and the coating solution is now ready to use. The reason for the two separate solutions is so that changes in the composition can be readily made for improvements and the coating solution may be as thin as 2½ Baumé if desired. The coating solution is applied to the plate by use of a plate whirling device.

The photolithographic plate coating can be used for surface plates such as zinc or aluminum plates. By having the ammonium phosphate and ammonium nitrate mixed in with the ammonium bichromate, and then mixing with the albumen solution, there is provided a coating solution which is more effective than previously discovered solutions. Furthermore, the solution will not deteriorate and is ready to use. The ammonium phosphate and ammonium nitrate serve to preserve the coating solution. Also, by using the ammonium phosphate and ammonium nitrate the coating solution can be thinner when put on the metal plate. After exposing through a negative, the image on the plate is more durable because of the thin coating, and this gives the developing ink which is rubbed on the plate a better chance to adhere to the image. The ammonium phosphate and ammonium nitrate in the coating solution also help to desensitize the plate on the unexposed areas to thereby make the developing of the plate under running water easier, faster and cleaner. Furthermore, the various other steps and the use of strong solutions are eliminated which are usually necessary in finishing the plate.

Plates coated with the coating solution of the present invention do not have to be used immediately and they can be set aside for several hours in a dark drawer and will not be affected by high temperature or high humidity.

Thus, it will be seen that there has been provided a photolithographic light sensitive plate coating for surface plates such as plates made of zinc or aluminum. When exposing the plate through a negative, a carbon arc light is used in the same manner as other plate coatings are exposed. If desired the ammonium hydroxide may be omitted, but if the albumen solution is to be kept for any length of time, then the ammonium hydroxide is preferably used. It is important in the present invention that there be a proper balance or proportion of dibasic ammonium phosphate and ammonium nitrate in the sensitive coating solution. The dibasic ammonium phosphate and ammonium nitrate, mixed with the bichromate solution and egg albumen solution provides an improvement over the old method of using the albumen solution and bichromate solution. With the present invention such processes as offset lithography will be improved and the cost of doing the work is less expensive because extra solutions and extra steps are eliminated.

In making another or different ammonium bichromate solution of 10° Baumé, 12 ounces of water can be mixed with 1 ounce of ammonium bichromate, together with ½ ounce aof ammonium phosphate which is dibasic, and ½ ounce of ammonium nitrate of an analytical reagent quality. Then each chemical is dissolved before adding the next chemical and after the ingredients are dissolved the solution is tested by a hydrometer until 10° Baumé.

Then, two parts of the albumen solution of 6° Baumé can be added to one part of bichromate solution of 10° Baumé and then water is added to make the solution 3° Baumé.

A further example of the solution may consist of 10 fluid ounces of the egg albumen solution at 6° Baumé, 5 fluid ounces of bichromate solution at 10° Baumé, and 22 fluid ounces of water.

Dibasic ammonium phosphate and ammonium nitrate preserve the solution so it will not deteriorate. Plates treated with the solution of the present invention can be set aside until needed and they will not be effected by high temperature or high humidity. Also, the coating can be used as a thin solution so that a more durable image on the plates is provided after being exposed through a negative so that the developing ink rubbed on the plate will adhere better to the image. The dibasic ammonium phosphate and ammonium nitrate desensitize the unexposed areas of the metal plate so that the plate will develop easier, faster and cleaner under running water and thereby eliminate the use of strong solutions.

The examples and modifications included herein are merely illustrative and it will be understood of course, that the invention is to be taken as limited only by the scope of the appended claim.

It has been found through experimentation that the proportions of albumen solution with the bichromate solution can be varied and by having two separate solutions, changes for improvements can be made. It is desired to stress the important action which takes place when the coating solution is used which has the diabasic ammonium phosphate and ammonium nitrate in it. These two chemicals in the coating solution play an important part in the present invention. The egg albumen scales are a form in which they are manufactured. By adding the diabasic ammonium phosphate and ammonium nitrate to the bichromate solution and albumen solution, there is provided a new and useful combination for making a light sensitive plate coating. The diabasic ammonium phosphate and ammonium nitrate in the coating solution preserve the coating solution so that it will not deteriorate. With the diabasic ammonium phosphate and ammonia nitrate in the coating solution, the plates can be coated and set in a dark drawer for several hours before use, and they will not be affected by high temperature or high humidity. With the diabasic ammonium phosphate and ammonium nitrate the coating can be used as a thinner solution, therefore making a thinner coating on the metal plate to assure a more durable image on the plate. After being exposed through a negative, and the developing ink rubbed on the plate, the material will adhere better to the image. The diabasic ammonium phosphate and ammonium nitrate in the coating solution helps to desensitize the unexposed areas of the metal plate so that the plate will develop easier, faster and cleaner under running water to thereby eliminate the use of strong solutions and other steps which are usually necessary in finishing the plate.

What is claimed is:

An improved method of preparing a plate coating solution, consisting of intermixing an ammonium bichromate solution with an albumen solution, said albumen solution being in the ratio of two parts thereof to one part of bichromate solution; said albumen solution consisting of four ounces egg albumen, twenty ounces of water, one ounce of ammonium hydroxide, said bichromate solution consisting of twelve ounces of water, one-half ounce diabasic ammonium phosphate, one-half ounce ammonium nitrate, and one and one-quarter ounces of ammonium bichromate.

References Cited in the file of this patent

UNITED STATES PATENTS

| 1,875,292 | John | Aug. 30, 1932 |
| 2,544,877 | Bryce | Mar. 13, 1951 |
| 2,624,672 | Frost et al. | Jan. 6, 1953 |
| 2,675,315 | Staehle et al. | Apr. 13, 1954 |
| 2,704,253 | Janet | Mar. 15, 1955 |

FOREIGN PATENTS

| 228,377 | Great Britain | Feb. 5, 1925 |